United States Patent [19]

Tajima et al.

[11] Patent Number: 5,165,468
[45] Date of Patent: Nov. 24, 1992

[54] OIL COOLER FOR AUTOMATIC TRANSMISSION

[75] Inventors: Makoto Tajima, Hachioji; Kuniaki Ohki, Atugi; Kei Beppu, Kanagawa; Hiroyuki Yoshida, Fuchu, all of Japan

[73] Assignee: Calsonic Co., Ltd., Tokyo, Japan

[21] Appl. No.: 736,070

[22] Filed: Jul. 25, 1991

[30] Foreign Application Priority Data

Aug. 6, 1990 [JP] Japan .................. 2-83701

[51] Int. Cl.⁵ .............. F20D 9/00; F28F 3/08
[52] U.S. Cl. ..................... 165/47; 165/167; 165/916; 74/606 A; 184/104.1; 60/912
[58] Field of Search ............ 165/916, 167, 47, 41; 74/606 A; 184/104.1; 60/912

[56] References Cited

U.S. PATENT DOCUMENTS

| | | | |
|---|---|---|---|
| 1,916,395 | 7/1933 | Stamsuik | 165/916 |
| 2,222,721 | 11/1940 | Ramsaur et al. | 165/916 |
| 2,511,084 | 6/1950 | Shaw | 165/916 |
| 2,528,013 | 10/1950 | Morris | 165/167 |
| 2,617,634 | 11/1952 | Jendrassik | 165/167 |
| 3,228,465 | 1/1966 | Vadot | 165/167 |
| 3,240,268 | 3/1966 | Armes | 165/167 |
| 4,058,980 | 11/1977 | Ahlen | 165/916 |
| 4,966,231 | 10/1990 | Belcher et al. | 165/167 |

FOREIGN PATENT DOCUMENTS

| | | | |
|---|---|---|---|
| 3824074 | 1/1990 | Fed. Rep. of Germany | 165/916 |
| 2494418 | 5/1982 | France | 165/916 |
| 0223492 | 10/1986 | Japan | 165/916 |

*Primary Examiner*—John K. Ford
*Attorney, Agent, or Firm*—Kalish & Gilster

[57] ABSTRACT

The gist of the present invention consists in an oil cooler for an automatic transmission, wherein opposite corners in a rectangular core made of a plurality of stacked plates are provided with a plate side oil passages, which are connected via an oil tank formed projectingly to the front side of the core, to oil inflow and outflow stud bolts. In the present invention, the opposite corners in the core are provided with plate side oil passages, which are connected via the oil tank formed projectingly to the front side of the core, to oil inflow and outflow stud bolts, which permits the whole core to be supplied with oil.

5 Claims, 3 Drawing Sheets

OIL COOLER FOR AUTOMATIC TRANSMISSION

BACKGROUND OF THE INVENTION

1. Field of the Invention

The present invention relates to an oil cooler for an automobile, in particular to an oil cooler for an automatic transmission used fixedly on its housing by means of stud bolts.

2. Description of the Prior Art

Two kinds of oil coolers for the automatic transmission are known. The configuration of one kind of an oil cooler is such that, as shown on the left side in FIG. 5, tank 15 for radiator 13 connected to engine 11 contains oil cooler 17. The configuration of the other kind of the oil cooler is such that as shown on the right side in FIG. 5, oil cooler 21 is fixed on the housing for automatic transmission 19.

For example, a catalog for "4000S, 4000CS and Coupe GT" manufactured by Audi discloses an oil cooler fixed on the housing for an automatic transmission.

FIGS. 6 and 7 show the oil cooler of this type for the automatic transmission. The oil cooler is characterized by oil inflow stud bolt 25 that carries oil from automatic transmission 19 and by oil outflow stud bolt 27 that feeds oil to automatic transmission 19, the two bolts penetrating at given interval P a water tank which contains a rectangular core made of a plurality of stacked plates.

Stud bolts 25 and 27 permit core 23 to be fixed on housing 29 for automatic transmission 19.

In these Figures, a number of 33 stands for a cooling water inflow tube and a number of 35 for a cooling water outflow tube.

In the oil cooler of the prior art for the automatic transmission, oil inflow stud bolt 25 and oil outflow stud bolt 27 placed on the longitudinal center line of core 23 at given interval P are used to fix core 23 on housing 29 for automatic transmission 19. Thus, it is not easy to circulate oil fully outside both the studs of core 23. This makes it difficult to obtain high thermal exchange efficiency.

A possible means for solving such problem is to widen the interval between oil inflow stud bolt 25 and oil outflow stud bolt 27. However, the means is a deus ex machina, because it is difficult to fix core 23 made of aluminum firmly and securely on the housing for automatic transmission 19 owing to a pressure problem. Further, another problem is brought about that core 23 arranged near the water inlet and outlet lends itself to the undesirable distribution of inflow water.

SUMMARY OF THE INVENTION

The present invention solves the above problems, an object of which is to provide an oil cooler for an automatic transmission that is capable of supplying the whole core of the oil cooler with oil.

Another object of the present invention is to provide an oil cooler for an automatic transmission characterized by high thermal exchange efficiency.

A further object of the present invention is to provide an oil cooler for an automatic transmission characterized by lower oil circulation resistance.

The gist of the present invention consists in an oil cooler for an automatic transmission, wherein a rectangular core made of a plurality of stacked plates is penetrated at a certain interval by an oil inflow stud bolt that carries oil from an automatic transmission and by an oil outflow stud bolt that feeds oil to the automatic transmission, the oil inflow and outflow stud bolts fixing the core on a housing for the automatic transmission, characterized in that plate side (inside the oil cooler where the stacked plates are located) oil passages are formed at first diametrically opposite corners in the core and connected via an oil tank projected from the core to the oil inflow and outflow stud bolts.

The present invention allows the plate side oil passages to be formed at diametrically opposite corners in the core even with the interval between the oil inflow and outflow stud bolts fully narrowed to make the pressure resistance of the oil cooler sufficiently high, so that a full amount of oil can be circulated in the core outside the oil inflow and outflow stud bolts in the core and, thus, sufficiently high thermal exchange efficiency can be obtained.

Further, the present invention is characterized by the configuration that the stud bolt is arranged in a collar which communicated with an oil tube at a certain radial interval from the collar and oil is led from the oil tank via the oil tube to the plate side oil passage. The configuration allows oil circulation resistance to be reduced significantly.

DESCRIPTION OF THE PREFERRED EMBODIMENT OF THE INVENTION

Given below is a description of a preferred embodiment of the present invention based on the attached drawings.

Figure 1:
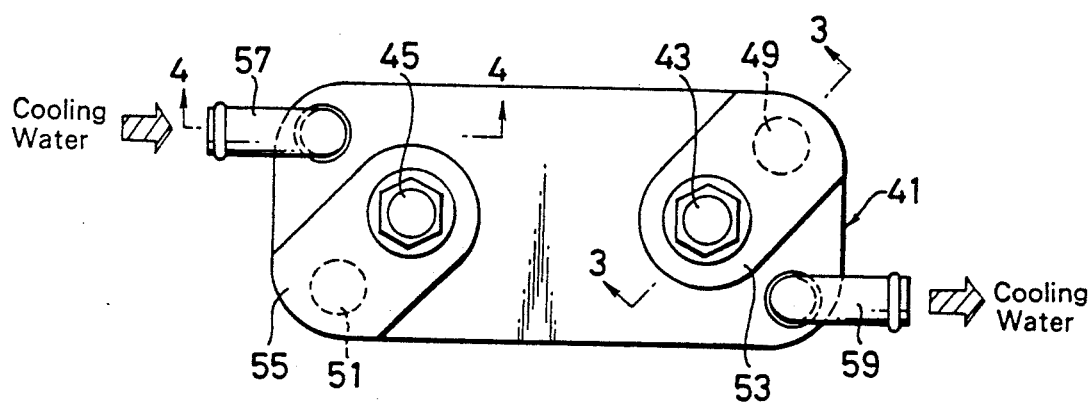
FIG. 1 shows the top view of a preferred embodiment of the oil cooler for an automatic transmission provided by the present invention.
Figure 2:
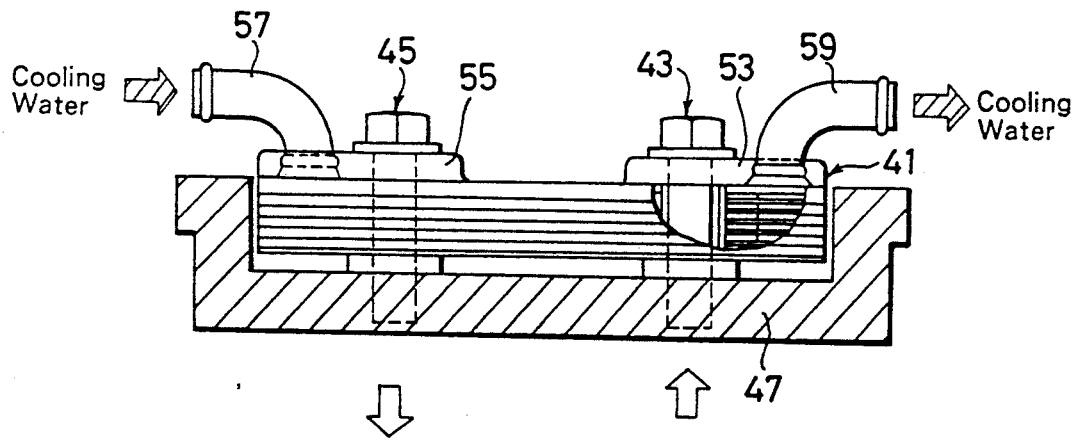
FIG. 2 shows a side view of the oil cooler for an automatic transmission given in FIG. 1.

FIGS. 1 and 2 show a preferred embodiment of the oil cooler for an automatic transmission provided by the present invention, where a number of 41 stands for a rectangular core made of a plurality of stacked aluminum plates.

Core 41 is penetrated by oil inflow stud bolt 43 that carries oil from an automatic transmission and by oil outflow stud bolt 45 that feeds oil thereto, both the stud bolts being arranged on the longitudinal center line at a given interval.

Core 41 is fixed on housing 47 of the automatic transmission by stud bolts 43 and 45.

At opposite corners in core 41, plate side oil passages 49 and 51 are formed.

Plate side oil passages 49 and 51 are connected via oil tanks 53 and 55 formed projectingly from core 41, to oil inflow stud bolt 43 and oil outflow stud bolt 45, respectively.

In the preferred embodiment, cooling water inflow tube 57 and cooling water outflow tube 59 are linked to the other opposite corners in core 41.

Figure 3:
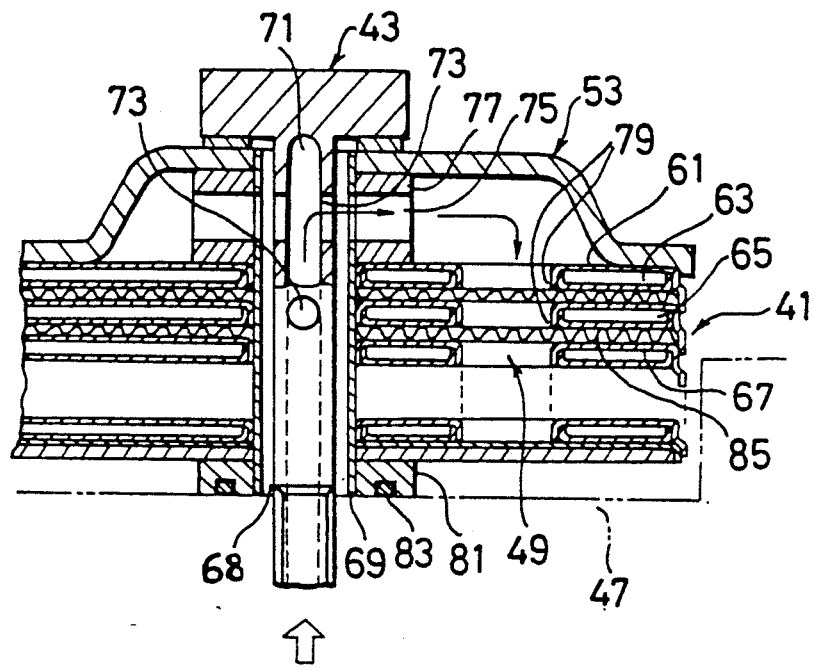
FIG. 3 shows the cross-sectional view along line 3—3 in FIG. 1.

FIG. 3 shows the cross-sectional view along line 3—3 in FIG. 1, where a number 41 stands for the core made of first aluminum plates 61 and second aluminum plates 63 stacked alternately. Core 41 has cooling water passage 65 and oil passage 67 formed.

Core 41 is penetrated by collar 69, whose upper end is linked with, the oil tank by notched retainer 77 through which oil passes through connecting wrap 75. Thus, core 41 can withstand high clamping force provided by the stud bolt.

In oil tube 68, oil inflow stud bolt 43 is inserted at a certain interval therefrom (spaced radially inward thereof).

Oil inflow stud bolt 43 is provided longitudinally with central hole 71 connected to housing 47 and further provided axially with a plurality of through-holes 73 connected to (in communication with) central hole 71.

On the top of retainer 77, an O-ring is fitted which seals the stud bolt.

At diametrically opposite corners in core 41 corresponding to first and second plates 61 and 63, coaxially aligned through-holes 79 are formed to provide plate side oil passages 49 and 51.

In the Figure, a number of 81 stands for a seat arranged under collar 69, which seat is provided with O-ring 83. A number of 85 stands for an inner fin arranged at oil passage 67.

Figure 4:
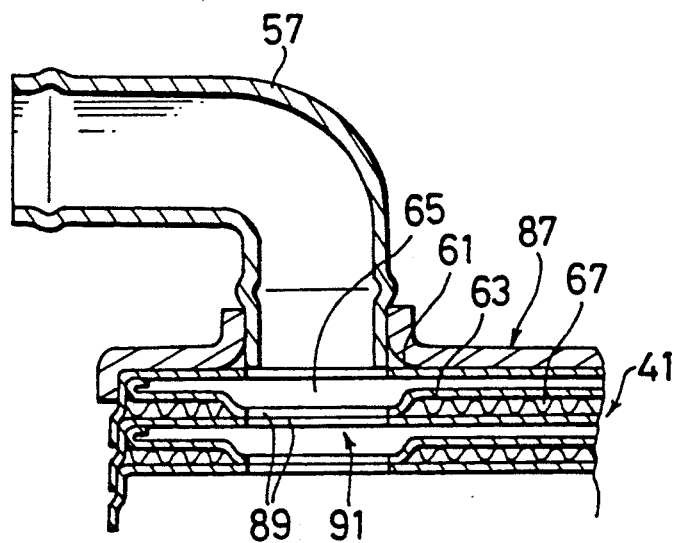
FIG. 4 shows the cross-sectional view along line 4—4 in FIG. 1.
Figure 5:
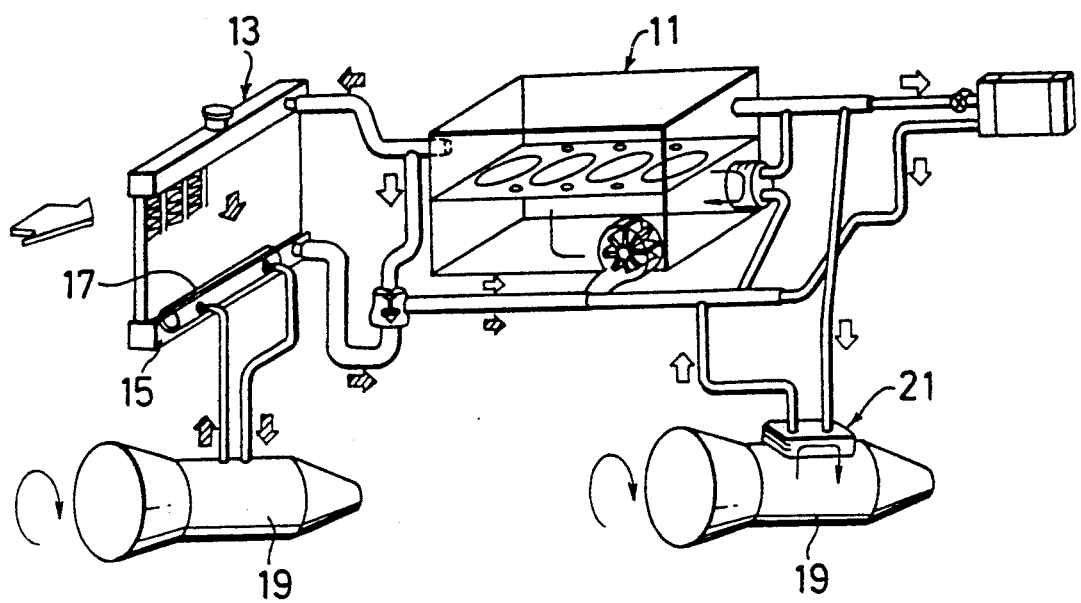
FIG. 5 provides an explanatory drawing for the prior-art oil cooler for an automatic transmission.
Figure 6:
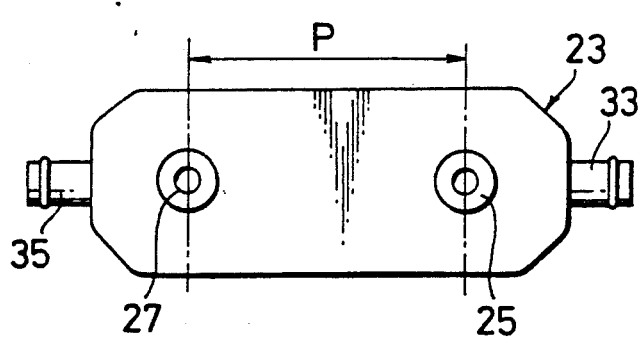
FIG. 6 provides the top view of the oil cooler of an automatic transmission to be fixed directly thereon.
Figure 7:
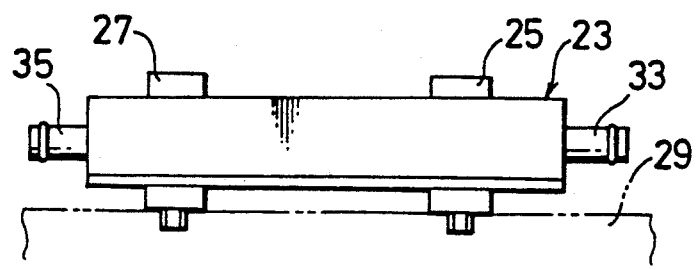
FIG. 7 shows a side view of the oil cooler for an automatic transmission provided in FIG. 6.

FIG. 4 shows the cross-sectional view along line 4—4 in FIG. 1, where a number of 41 stands for the core made of first and second plates 61 and 63 stacked alternately. Core 41 has cooling water passage 65 and oil passage 67 formed by the alternately stacked plates.

Cooling water inflow tubing 57 is linked to the corner longitudinally opposite to the front oil passage in core 41 as shown in FIGS. 1 and 4 and described hereafter.

First and second plates 61 and 63 are provided with through-holes 89, which allow plate side cooling water passage 91 to be formed in core 41.

The structure near oil outflow stud bolt 45 and cooling water outflow tube 59 is almost the same as that shown in FIGS. 3 and 4, with the exception that the direction of oil and cooling water flow is reversed. Thus, a detailed description thereof is omitted.

Presented below is the circulation of oil in the so configured oil cooler for an automatic transmission. Oil from the automatic transmission flows via oil inflow stud bolt 43 into oil tank 53. The oil passes through oil tank 53 and flows into plate side oil passage 49 formed at the corner of core 41. When oil passage 67 formed at plates 61 and 63 is filled, the oil passes through plate side oil outflow passage 51 formed at the opposite corner, flowing into oil tank 55. Then, the oil flows via oil tank 55 into oil outflow stud bolt 45, being returned to the automatic transmission.

Cooling water flows via upper cooling water inflow tube 57 at the top of core 41 into cooling water tank 87. Then, the cooling water passes through cooling water passage 91 at first and second plates 61 and 63, filling cooling water passage 65. The cooling water cools oil in oil passage 67 as the water flows out of cooling water outflow tube 59.

In the so configured oil cooler for an automatic transmission, oil tanks 53 and 55 are structured of plate side oil passages 49 and 51 formed at diametrically opposite corners in core 41 and projected therefrom, and are connected to longitudinally coaligned oil inflow and outflow stud bolts 43 and 45, which allows whole core 41 to be supplied with oil.

In the so configured oil cooler for an automatic transmission, even with the interval between oil inflow and outflow stud bolts 43 and 45 fully narrowed to provide high pressure resistance, plate side oil passages 49 and 51 are formed at diametrically opposite corners in core 41, whereby full oil can also be circulated outside oil inflow stud bolt 43 and oil outflow stud bolt 45, which provides sufficiently high thermal exchange efficiency.

Further, in the so configured oil cooler for an automatic transmission, stud bolt 43 is placed in collar 69 at a given interval therefrom and oil is thereby led via oil tank 53 into plate side oil passage 49, which allows oil circulation resistance to be reduced significantly.

What is claimed is:

1. An oil cooler for an automatic transmission, comprising a rectangular core made of a plurality of stacked plates penetrated at a certain interval by an oil inflow stud bolt having a hollow center that carries oil from said automatic transmission and by an oil outflow stud bolt having a hollow center that feeds oil to said automatic transmission, said oil inflow and outflow stud bolts being located along a central longitudinal axis of said cooler and fixing said core on a housing of said automatic transmission, characterized in that plate side oil passages are formed in said core at first diametrically opposite corner thereof and connected via fluid passages formed in an oil tank which projects outwardly from said core, to corresponding oil inflow and outflow stud bolts.

2. An oil cooler for an automatic transmission as set forth in claim 1, characterized in that said rectangular core is formed of first and second aluminum plates stacked alternately.

3. An oil cooler for an automatic transmission as set forth in claim 1, characterized in that cooling water inflow and outflow tubes are linked to second diametrically opposite corners in said core.

4. An oil cooler for an automatic transmission as set forth in claim 1, characterized in that said oil tank is formed on the front side of said core and is connected to said core via a collar which serves as an oil tube and an upper retainer therearound, that this collar contains said oil inflow stud bolt inserted at a given interval therefrom, that said oil inflow stud bolt is provided longitudinally with a central hole connected to said housing and further provided axially with a through-hole in communication with said central hole, and that said retainer forms a guide member with a connecting way placed outside said oil tube located in said oil tank.

5. An oil cooler for an automatic transmission as set forth in claim 2, characterized in that said plate side oil passages are formed by coaxially aligned through-holes formed in first diametrically opposite corners of said first and second plates in said core.

* * * * *